June 14, 1932. L. W. HOTTEL 1,863,117
MOLDING PRESS FOR HOLLOW ARTICLES
Filed Jan. 27, 1930 2 Sheets-Sheet 1
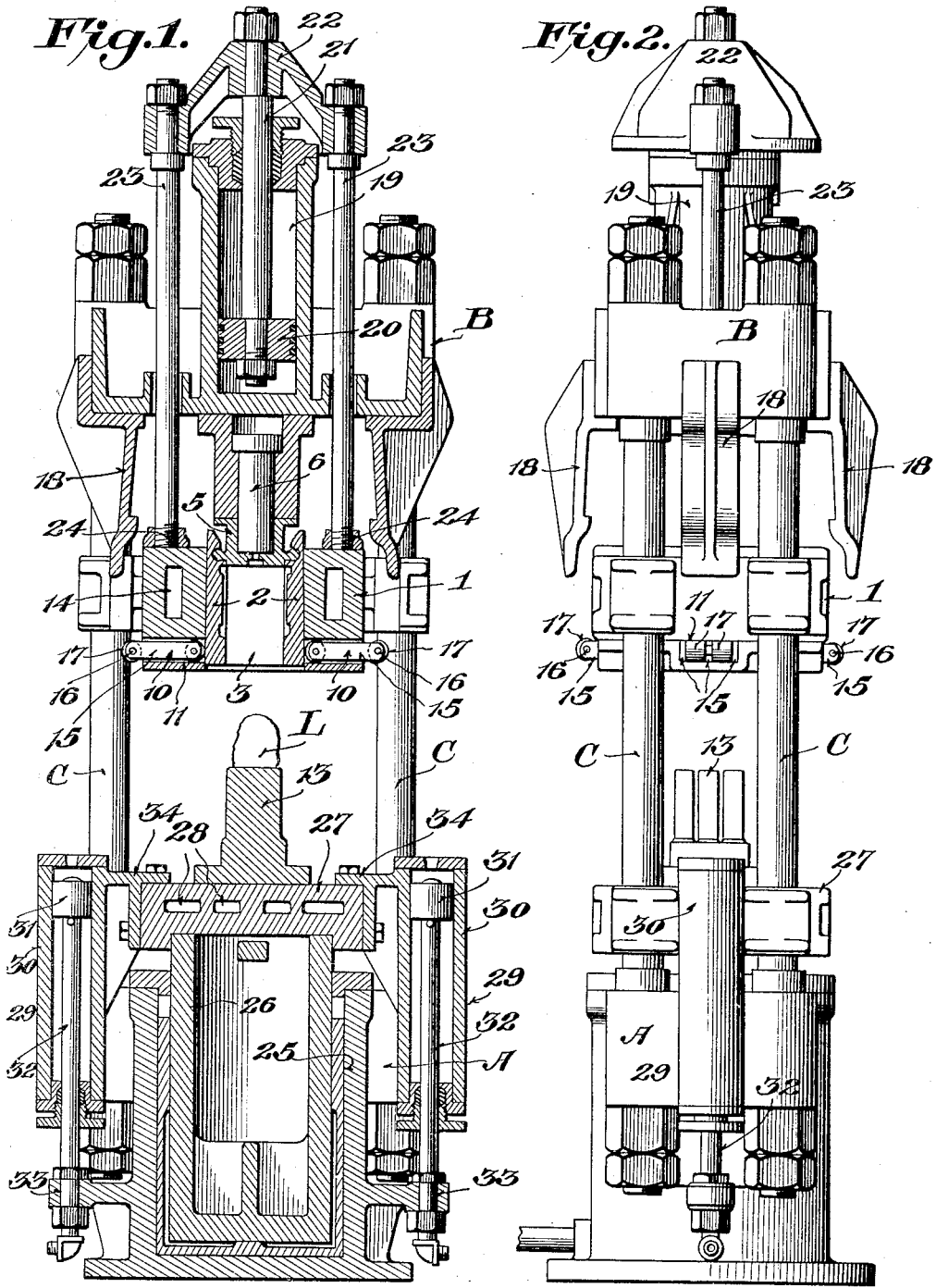
INVENTOR
Louis W. Hottel,
BY
ATTORNEY June 14, 1932.  L. W. HOTTEL  1,863,117
MOLDING PRESS FOR HOLLOW ARTICLES
Filed Jan. 27, 1930   2 Sheets-Sheet 2

INVENTOR
Louis W. Hottel,
BY
ATTORNEY.

Patented June 14, 1932

1,863,117

UNITED STATES PATENT OFFICE

LOUIS W. HOTTEL, OF INDIANAPOLIS, INDIANA

MOLDING PRESS FOR HOLLOW ARTICLES

Application filed January 27, 1930. Serial No. 423,812.

This invention relates to a molding press for forming hollow articles from plastic composition, and has special reference to presses of that kind primarily employed in the manufacture of electric storage battery boxes from suitable plastic compositions.

A primary object of the invention is to provide a novel press construction which permits a battery box or equivalent article to be made economically and on a rapid production basis. Also, the invention contemplates a novel combination of features which facilitate an automatic and positive opening and closing of the mold without disassembling the mold or otherwise interfering with a consecutive operation of the press.

With these and other objects in view which will be apparent to those familiar with the art the invention consists in the novel construction, combination and arrangement of parts hereinafter more fully described, illustrated and claimed, and a preferable embodiment of the invention is shown in the accompanying drawings, in which:—

Figure 1 is a vertical longitudinal sectional view of a molding press embodying the present invention.

Figure 2 is a side elevation of the press.

Figure 3:
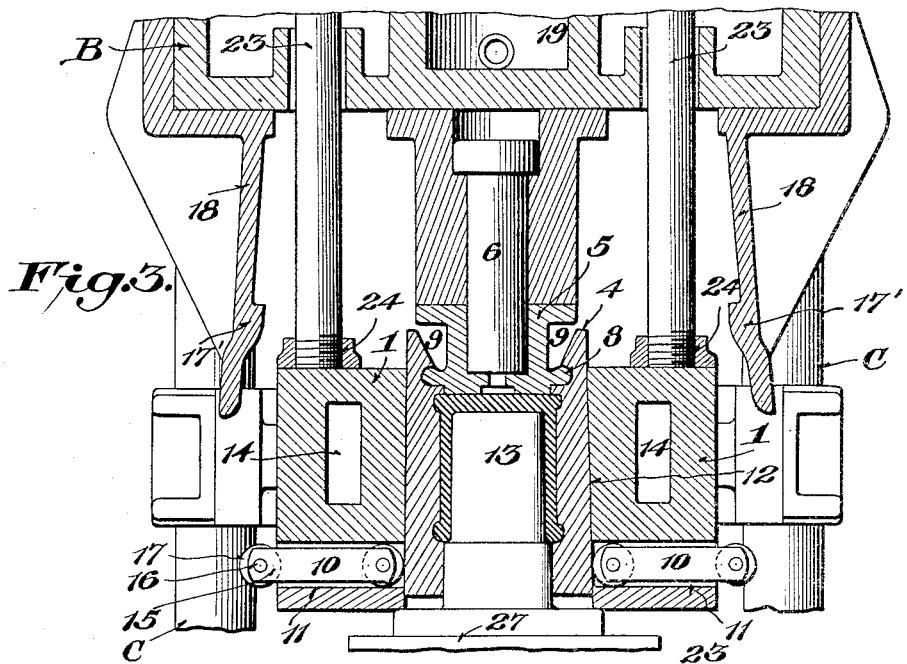
Figure 3 is an enlarged sectional view of the mold and its related parts showing the mold closed and a battery box formed therein.
Figure 4:
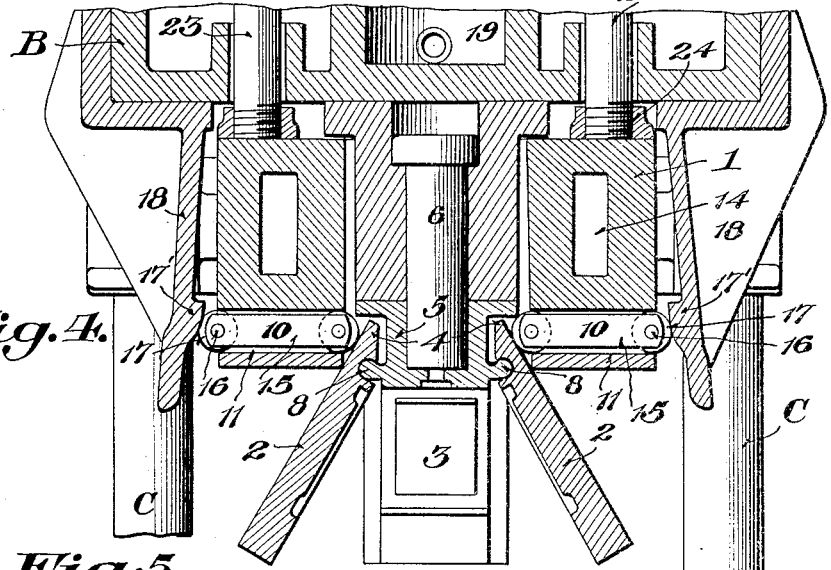
Figure 4 is a view similar to Fig. 3 illustrating the parts in the relative positions which they occupy when the mold is opened automatically to release the molded article.

In the example of the invention shown in the drawings the press includes in its general organization a press base A, an upper press head B and the upright frame standards C bolted to, or otheise suitably connecting, in a rigid manner, the press base and the press head, permitting a rigid frame structure which supports and carries the working parts of the press. A distinguishing feature of the present invention resides in the construction of the mold and the parts cooperating therewith to provide for the automatic closing and opening of the mold. The mold comprises a mold case or die box 1 and an articulated mold proper consisting of a plurality of side and end lining plates 2 and 3 respectively having suitably hinged or articulated connections at or near their upper ends as at 4 with a mold head piece 5 constituting and forming the mold bottom. This mold head piece 5 is rigidly fitted to a supporting pin or equivalent element 6 mounted within a hanger boss 7 or equivalent element which is secured to the underside of the upper press head B. The upper edge portions 8 of the side and end lining plates 2 and 3 of the mold proper are extended above the hinge or pivot connections 4 to provide short lever elements having a play within the clearance spaces 9 formed in the side of the mold head piece 5 so that the mold lining plates can swing outwardly upon their hinges or pivots when inward pressure is applied to said lever elements 8 by the presser slides or mold opening members 10 which are mounted for sliding movement in guide openings 11 formed transversely in the lower part of the mold case or die box 1 in each of the sides thereof.

The mold case or die box 1 is preferably formed with an inside tapered opening 12 for the mold proper 2—3 and the outer faces of the mold lining plates 2 and 3 are correspondingly tapered so that when the mold proper is closed it has a tight rigid engagement with the wall of the mold opening 12 so that the mold will readily withstand the pressure exerted within the mold by the upward movement of the mold core 13 when the box or other hollow article is being formed.

Figure 5:
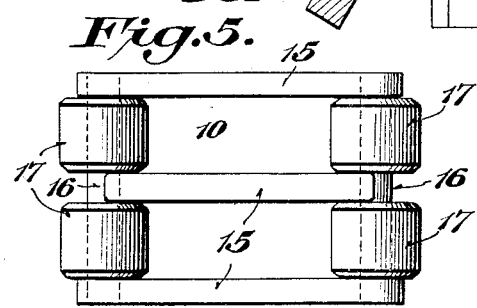
Figure 5 is a detail plan view of one of the presser slides which constitute the mold opening members for causing the automatic opening of the mold proper after the article has been finished and ready for discharge from the press.

The mold case or die box 1 may be provided therein with one or more fluid circulating passages 14 having suitable connection with a fluid circulatory system for supplying either water or steam according to whether the mold is to be cooled for asphalt or equivalent compositions or to be heated if used as a vulcanizing press. The presser slides or mold opening members 10 which are mounted in and carried by the mold case or die box 1 may be of any suitable construction but preferably are made as shown in Fig. 5 of the drawings, that is, consisting of a plurality of spaced plates 15 carrying at their ends axles 16 upon which are mounted anti-friction bearing rollers 17 which respectively ride against the outer faces of the mold lining plates and their short lever extensions 8, and against stationary cam elements 17 carried by fixed cam arms 18 suitably secured to the upper press head B, the said cam elements 17 being arranged in the path of the outer roller ends of the presser slides 10.

An upper power unit raises and lowers the mold case or die box 1. This upper power unit consists of a fluid cylinder 19, connected with a source of fluid or steam supply and surmounts the upper press head B; a piston 20 operating within the cylinder and fitted to the piston rod 21 whose upper end is secured to a cross head 22, the opposite ends of which have connected thereto the upper ends of carrying rods 23 the lower ends of which, as at 24, are suitably secured to the mold case or die box 1.

A lower power unit incorporated with the press base 1 includes a conventional ram cylinder 25 within which operates the hydraulic ram 26 carrying at the top a press platen 27 upon which is mounted the mold core 13 previously referred to and which operates in axial alinement with the mold carried in and by the upper part of the press. The press platen 27 may be provided therein with fluid circulating channels 28 suitably connected with a circulatory system for subjecting water or steam thereto according to the character of the composition being used in the press for making the hollow articles or boxes, and a supplementary feature of the present invention is that of preferably connecting with the press platen 27 auxiliary power units 29 each consisting of a cylinder 30 and a piston 31 therein fitted to a piston rod 32, the lower end of the piston rod preferably being rigidly fastened as at 33 to the cylinder 25 or other rigid part of the base while the cylinder 30 is fastened as at 34 to the press platen 27. The purpose of these auxiliary power units is to speed up the retreat or lowering movement of the bottom ram and the mold core 13 carried thereby, it being the intended operation for water or steam under pressure to be introduced into the auxiliary cylinders 30 when the power is cut off from the lower ram and the exhaust therefore is opened with the result of aiding the force of gravity by power to quickly lower the lower ram with its core 13.

In the making of a battery box or other hollow article it will be seen that the mold parts in the closed position shown in Fig. 1 of the drawings with a lump of the plastic material, as indicated at L, placed on the core 13 so that when power is applied to the lower ram the core 13 is elevated carrying therewith the lump of plastic material, and the core and material entering the mold whose parts are held in the rigid relation described, causes the plastic material to follow the interior outlines of the mold, as shown in Fig. 3 of the drawings and thereby form the article under great pressure. Assuming the article to be made of the asphalt composition and water circulated about the mold through the circulating passage 14, the article will quickly cool sufficiently to permit the opening of the mold and the first step in the operation of releasing the molded article is to cut off the power from the lower ram and at the same time supply power to the upper power unit which causes the power lifting of the mold case 1 thereby easing the lateral pressure from the article in the mold so that the core can readily break away from the interior of the molded article and retreat away from the interior of the molded article and retreat downwardly with the ram whose movement is accelerated by the auxiliary power units 29 as before referred to. As the mold case or die box 1 rises the outer roller ends of the presser slides 10 come into operative contact with the stationary cam elements whose cam surface is of such a formation as to cause the presser slides or mold opening members 10 to forcibly move inward against the lever arms or extensions 8 of the mold lining plates. This action occurs when the presser slides 10 are brought above the hinge or pivot points 8 for the lining plates, with the result that said lining plates are positively and automatically swung outwardly upon their hinges or pivots and entirely freed from the battery box or hollow article which will be caught and taken away by the workman. A lowering of the mold case or die box 1 causes the latter to sleeve over the mold lining plates 2 and 3 and thereby bring them into their closed mold forming relation shown in Fig. 1 of the drawings.

I claim:—

1. In a molding press of the class described, an articulated mold plate assembly, fixed cam elements and a movable mold case carrying mold opening members actuated by said cam elements to cause the opening of the mold plate assembly.

2. A molding press of the class described including a power actuated ram, a suspended articulated mold plate assembly consisting of a group of pivotally hung plates having short lever elements above their pivots, fixed cam elements and a power actuated movable mold case carrying presser slides engaging at one end against the cam elements and at their opposite ends against the lever elements of the plates to cause outward swinging movement of the latter for opening the plate assembly.

3. A molding press of the class described including a power actuated ram, a suspended articulated mold plate assembly consisting of a group of pivotally hung plates having short lever elements above their pivots, fixed cam elements and a power actuated movable mold case carrying presser slides having end rollers engaging at one end against the cam elements and at their opposite ends against the lever elements of the plates to cause outward swinging movement of the latter for opening the plate assembly.

4. A molding press of the class described including a power actuated core, a suspended articulated mold plate assembly consisting of a pivotally hung group of plates having short lever elements above their pivots, fixed cam elements, a vertically movable power actuated mold case sleeving over the mold plate assembly and provided with guide openings therein, and mold opening presser slides mounted in said guide opening and having their opposite ends adapted respectively to engage the cam elements and the lever elements of the plates for causing automatic opening of the mold plate assembly when the mold case is raised.

5. In a molding press, an articulated mold plate assembly, a mold case movable to a position to receive said mold plate assembly and to effect closing movement of the mold plates, said mold case being retractible from such position to release the mold plates for opening movement, slidable members carried by the mold case, cam means rendered effective by retractible movement of said mold case to produce sliding movement of said members, and means whereby sliding movement of said members is effective to produce opening movement of said mold plates.

6. In a molding press, an articulated mold plate assembly, a mold case, means for imparting relative movement between said mold case and said mold plate assembly to two different positions in one of which the mold plate assembly is received within the mold case and is closed thereby and in the other of which the mold plate assembly is disposed outwardly of the mold case whereby the mold plates are released for opening movement, cam means outside of the mold case, and members carried by the mold case and cooperating with said cam means and the mold plates when the mold case and the mold plate assembly are relatively moved to the second mentioned position to positively effect opening movement of the mold plates.

7. In a molding press, articulated mold plates, a mold case movable into embracing relation to said mold plates to effect swinging movement of the same to a closed position, said case being retractible from its position in embracing relation to said plates, members slidable in said mold case, means rendered effective by retractile movement of said mold case to slide said members, and means whereby sliding movement of said members under the influence of retractile movement of the mold case is effective to open said mold plates.

In testimony whereof I hereunto affix my signature.

LOUIS W. HOTTEL.